(12) United States Patent
Watanabe et al.

(10) Patent No.: US 10,677,345 B2
(45) Date of Patent: Jun. 9, 2020

(54) CONTROL DEVICE OF AUTOMATIC TRANSMISSION

(71) Applicant: TOYOTA JIDOSHA KABUSHIKI KAISHA, Toyota-shi (JP)

(72) Inventors: Hiroshi Watanabe, Sunto-gun (JP); Akira Eiraku, Numazu (JP); Koji Morita, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 15 days.

(21) Appl. No.: 16/238,562

(22) Filed: Jan. 3, 2019

(65) Prior Publication Data

US 2019/0219155 A1    Jul. 18, 2019

(30) Foreign Application Priority Data

Jan. 17, 2018    (JP) .................................. 2018-005791

(51) Int. Cl.
*F16H 61/02* (2006.01)
*F16H 59/72* (2006.01)
(Continued)

(52) U.S. Cl.
CPC ....... *F16H 61/0204* (2013.01); *F16D 48/062* (2013.01); *F16H 57/01* (2013.01);
(Continued)

(58) Field of Classification Search
CPC ...... F16H 57/01; F16H 57/0413; F16H 59/72; F16H 2057/014; F16H 59/54; F16H 59/44; F16H 2200/2007; F16H 2003/445; F16H 61/0025; F16H 3/66; F16H 59/24; F16H 2200/2043; F16H 2200/0043; F16H 2200/0241; F16D 48/062;
(Continued)

(56) References Cited

U.S. PATENT DOCUMENTS

2008/0058156 A1 *   3/2008   Kakisaka ................ F16H 61/20
                                                              477/110

FOREIGN PATENT DOCUMENTS

| JP | 2008-64154 | 3/2008 |
| JP | 2009-287676 | 12/2009 |
| JP | 2012-154427 | 8/2012 |

* cited by examiner

*Primary Examiner* — Tinh Dang
(74) *Attorney, Agent, or Firm* — Oblon, McClelland, Maier & Neustadt, L.L.P.

(57) ABSTRACT

A control device of an automatic transmission controls an automatic transmission 1 comprising a transmission mechanism 3 including a plurality of engagement elements, and a hydraulic oil supply device 4 supplying hydraulic oil to the transmission mechanism The control device of the automatic transmission comprises an engagement element control part 41 configured to use the hydraulic oil supply device to make the plurality of engagement elements change between an engaged state and a disengaged state; and a deceleration degree calculating part 42 configured to calculate a target deceleration degree of a vehicle in which the automatic transmission is provided. The engagement element control part is configured to make the engagement element in the disengaged state engage so that the vehicle decelerates if the target deceleration degree is equal to or more than a predetermined value when an increase in temperature of hydraulic oil in the automatic transmission is demanded.

15 Claims, 8 Drawing Sheets

(51) Int. Cl.
    *F16H 57/04*         (2010.01)
    *F16H 57/01*         (2012.01)
    *F16D 48/06*         (2006.01)
    *F16H 3/44*          (2006.01)
    *F16H 61/00*         (2006.01)
    *F16H 3/02*          (2006.01)
    *F16H 59/54*         (2006.01)
    *F16H 59/44*         (2006.01)
    *F16H 3/66*          (2006.01)
    *F16H 59/24*         (2006.01)

(52) U.S. Cl.
    CPC ..... *F16H 59/72* (2013.01); *F16D 2500/1045* (2013.01); *F16D 2500/1085* (2013.01); *F16D 2500/30803* (2013.01); *F16D 2500/70426* (2013.01); *F16H 2057/014* (2013.01)

(58) Field of Classification Search
    CPC ..... F16D 2500/1045; F16D 2500/1085; F16D 2500/30803; F16D 2500/70426; F16D 2500/3056; F16D 2500/50653; F16D 2500/7041; F16D 2500/3109
    See application file for complete search history.

|   | C1 | C2 | C3 | B1 | B2 |
|---|----|----|----|----|----|
| 1 | ○ | × | × | ○ | × |
| 2 | ○ | × | × | × | ○ |
| 3 | ○ | ○ | × | × | × |
| 4 | × | ○ | × | × | ○ |
| R | × | × | ○ | ○ | × |

CONTROL DEVICE OF AUTOMATIC TRANSMISSION

FIELD

The present invention relates to a control device of an automatic transmission.

BACKGROUND

Known in the past has been an automatic transmission provided with a torque converter and a transmission mechanism. The torque converter and transmission mechanism are supplied with hydraulic oil for operation and lubrication. However, if the hydraulic oil is low in temperature, the hydraulic oil rises in viscosity and the drive resistance in the automatic transmission increases.

For this reason, when the hydraulic oil is low in temperature such as when starting up a vehicle, it is desirable to be able to raise the temperature of the hydraulic oil. In the hydraulic oil temperature control device described in PTL 1, to reduce the effect on the acceleration performance of the vehicle, the hydraulic oil is increased in temperature when the vehicle is decelerating. Further, in the control device of an automatic transmission described in PTL 2, when using the transmission mechanism to change the gear, an engagement element of the transmission mechanism slips, and therefore the hydraulic oil is increased in temperature.

CITATION LIST

Patent Literature

[PTL 1] Japanese Unexamined Patent Publication No. 2009-287676
[PTL 2] Japanese Unexamined Patent Publication No. 2012-154427

SUMMARY

Technical Problem

Several methods exist for causing hydraulic oil to rise in temperature, but it is known that using the heat of friction when making an engagement element of a transmission mechanism change between an engaged state and disengaged state so as to make the hydraulic oil rise in temperature is effective. However, if changing the state of an engagement element, the speed of the output shaft of the transmission mechanism changes and the drivability is liable to deteriorate. For example, even if making the state of an engagement element change at the time of deceleration of the vehicle such as described in PTL 1, the drivability will deteriorate if the degree of deceleration of the vehicle caused by changing the state of the engagement element is larger than the target degree of deceleration.

Further, with the method described in PTL 2, the hydraulic oil is increased in temperature only when changing the gear. For this reason, it is not possible to effectively make the hydraulic oil rise in temperature in response to a demand to raise the temperature of the hydraulic oil.

Therefore, an object of the present invention is to provide a control device of an automatic transmission able to keep the drivability from deteriorating while promoting an increase in temperature of the hydraulic oil in the automatic transmission.

Solution to Problem

The summary of the present disclosure is as follows.

(1) A control device of an automatic transmission for controlling an automatic transmission comprising a transmission mechanism including a plurality of engagement elements and a hydraulic oil supply device supplying hydraulic oil to the transmission mechanism, comprising: an engagement element control part configured to use the hydraulic oil supply device to make the plurality of engagement elements change between an engaged state and a disengaged state; and a deceleration degree calculating part configured to calculate a target deceleration degree of a vehicle in which the automatic transmission is provided, wherein the engagement element control part is configured to make the engagement element in the disengaged state engage so that the vehicle decelerates if the target deceleration degree is equal to or more than a predetermined value when an increase in temperature of hydraulic oil in the automatic transmission is demanded.

(2) The control device of an automatic transmission described in above (1), wherein the engagement element control part is configured to make a state of the engagement element change so that the vehicle does not decelerate if the target deceleration degree is less than a predetermined value when an increase in temperature of hydraulic oil in the automatic transmission is demanded.

(3) The control device of an automatic transmission described in above (1), further comprising a temperature raising part configured to make hydraulic oil in the automatic transmission rise in temperature, wherein the temperature raising part is configured to make hydraulic oil in the automatic transmission rise in temperature without changing a state of the engagement element if the target deceleration degree is less than a predetermined value when an increase in temperature of hydraulic oil in the automatic transmission is demanded.

(4) The control device of an automatic transmission described in above (1), further comprising an oil temperature calculating part configured to calculate a temperature of the hydraulic oil around the engagement element, wherein the engagement element control part is configured to make the engagement element in the disengaged state engage so that the vehicle decelerates if the target deceleration degree is equal to or more than a predetermined value and a temperature of the hydraulic oil around the engagement element is equal to or less than a predetermined value when an increase in temperature of hydraulic oil in the automatic transmission is demanded.

(5) The control device of an automatic transmission described in above (4), wherein the engagement element control part is configured to change a state of the engagement element so that the vehicle does not decelerate if the target deceleration degree is less than a predetermined value and the temperature of the hydraulic oil around the engagement element is equal to or less than a predetermined value when an increase in temperature of hydraulic oil in the automatic transmission is demanded.

(6) The control device of an automatic transmission described in above (4) or (5), further comprising a temperature raising part configured to make hydraulic oil in the automatic transmission rise in temperature, wherein the temperature raising part is configured to make hydraulic oil in the automatic transmission rise in temperature without changing a state of the engagement element if a temperature of the hydraulic oil around the engagement element is higher than a predetermined value when an increase in temperature of hydraulic oil in the automatic transmission is demanded.

(7) The control device of an automatic transmission described in above (1), further comprising a wear calculating part configured to calculate a degree of wear of the engagement element, wherein the engagement element control part is configured to make the engagement element in the disengaged state engage so that the vehicle decelerates if the target deceleration degree is equal to or more than a predetermined value and the degree of wear of the engagement element is equal to or less than a predetermined value when an increase in temperature of hydraulic oil in the automatic transmission is demanded.

(8) The control device of an automatic transmission described in above (7), wherein the engagement element control part is configured to change a state of the engagement element so that the vehicle does not decelerate if the target deceleration degree is less than a predetermined value and the degree of wear of the engagement element is equal to or less than a predetermined value when an increase in temperature of hydraulic oil in the automatic transmission is demanded.

(9) The control device of an automatic transmission described in above (7) or (8), further comprising a temperature raising part configured to make hydraulic oil in the automatic transmission rise in temperature, wherein the temperature raising part is configured to make hydraulic oil in the automatic transmission rise in temperature without changing the state of the engagement element if the degree of wear of the engagement element is greater than a predetermined value when an increase in temperature of hydraulic oil in the automatic transmission is demanded.

(10) The control device of an automatic transmission described in above (1), further comprising an oil temperature calculating part configured to calculate a temperature of the hydraulic oil around the engagement element, and a wear calculating part configured to calculate a degree of wear of the engagement element, wherein the engagement element control part is configured to make the engagement element in the disengaged state engage so that the vehicle decelerates if the target deceleration degree is equal to or more than a predetermined value, the temperature of the hydraulic oil around the engagement element is equal to or less than a predetermined value, and the degree of wear of the engagement element is equal to or less than a predetermined value when an increase in temperature of hydraulic oil in the automatic transmission is demanded.

(11) The control device of an automatic transmission described in above (10), wherein the engagement element control part is configured to change a state of the engagement element so that the vehicle does not decelerate if the target deceleration degree is less than a predetermined value, the temperature of the hydraulic oil around the engagement element is equal to or less than a predetermined value, and the degree of wear of the engagement element is equal to or less than a predetermined value when an increase in temperature of hydraulic oil in the automatic transmission is demanded.

(12) The control device of an automatic transmission described in above (10) or (11), further comprising a temperature raising part configured to make hydraulic oil in the automatic transmission rise in temperature, wherein the temperature raising part is configured to make hydraulic oil in the automatic transmission rise in temperature without changing a state of the engagement element if the temperature of the hydraulic oil around the engagement element is higher than a predetermined value or if the degree of wear of the engagement element is greater than a predetermined value when an increase in temperature of hydraulic oil in the automatic transmission is demanded.

Advantageous Effects of Invention

According to the present invention, there is provided a control device of an automatic transmission able to keep the drivability from deteriorating while promoting an increase in temperature of the hydraulic oil in the automatic transmission.

DESCRIPTION OF EMBODIMENTS

Figure 1:
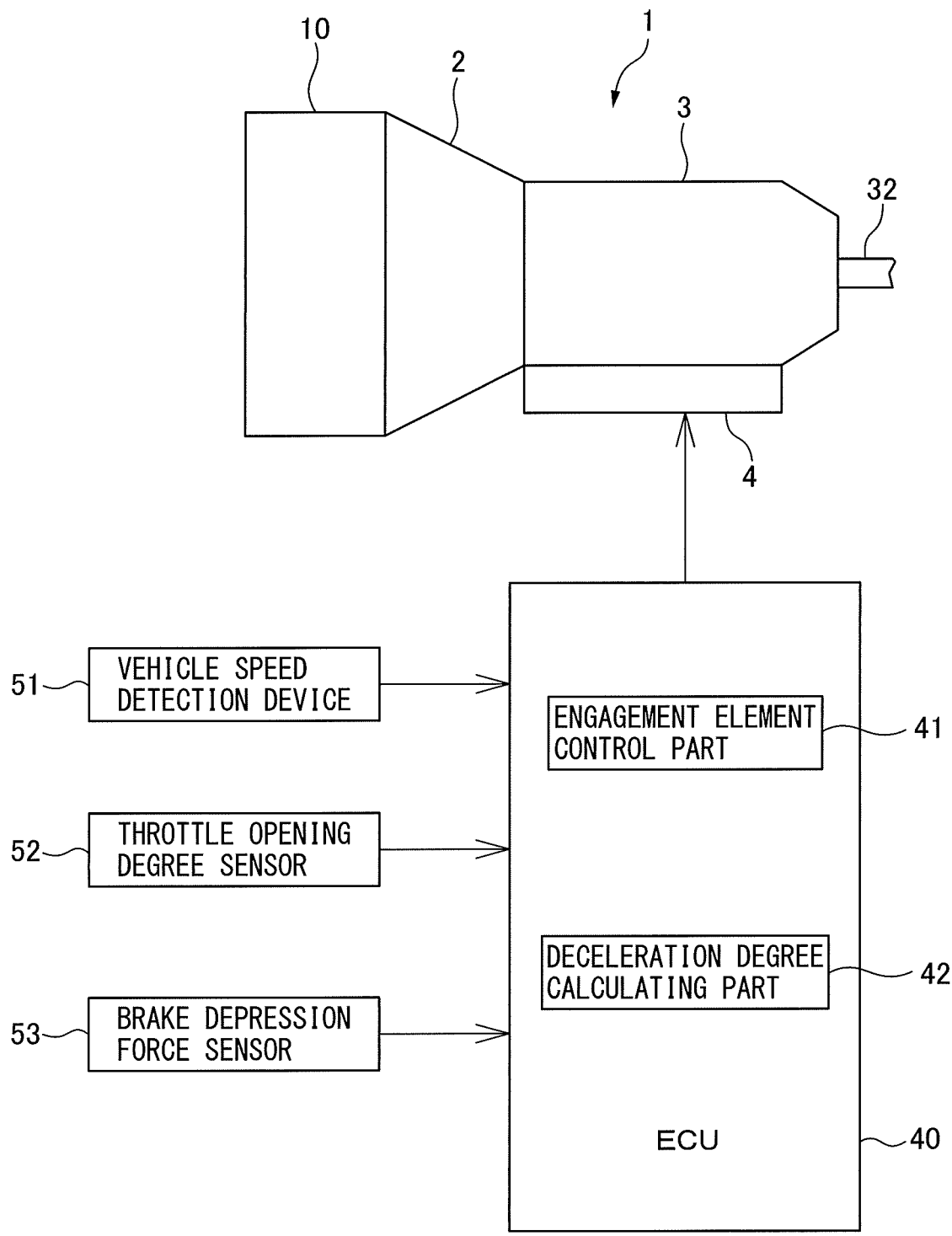
FIG. 1 is a view schematically showing a control device of an automatic transmission according to a first embodiment of the present invention and an automatic transmission to which the control device is applied.

Below, referring to the drawings, embodiments of the present invention will be explained in detail. Note that, in the following explanation, similar components are assigned the same reference signs.

First Embodiment

First, referring to FIG. 1 to FIG. 5, a first embodiment of the present invention will be explained.

Configuration of Automatic Transmission

FIG. 1 is a view schematically showing a control device of an automatic transmission according to the first embodiment of the present invention and an automatic transmission to which the control device is applied. An automatic transmission 1 and an internal combustion engine 10 are provided in a vehicle. The automatic transmission 1 transmits an output of the internal combustion engine 10 to the wheels of the vehicle. The internal combustion engine 10 is, for example, a gasoline engine or a diesel engine.

The automatic transmission 1 automatically switches the gear ratio in accordance with the vehicle speed etc. That is, automatic transmission 1 is a so-called "AT". The automatic transmission 1 is provided with a torque converter 2, a transmission mechanism 3, and a hydraulic oil supply device 4.

The torque converter 2 transmits the output of the internal combustion engine 10 to the transmission mechanism 3. The torque converter 2 is provided with a pump impeller coupled with an output shaft (crankshaft) of the internal combustion engine 10, a turbine liner coupled with an input shaft of the transmission mechanism 3, a lockup clutch mechanically joining the input shaft and output shaft of the torque converter 2, etc.

Inside the torque converter 2, hydraulic oil called an "automatic transmission fluid (ATF)" is filled. If output of the internal combustion engine 10 causes the pump impeller to turn, the rotational force of the pump impeller is transmitted to the turbine liner through the hydraulic oil resulting in the turbine liner rotating. If the lockup clutch is connected, the drive force of the input shaft of the torque converter 2 is directly transmitted to the output shaft of the torque converter 2.

Figures 2, 3:
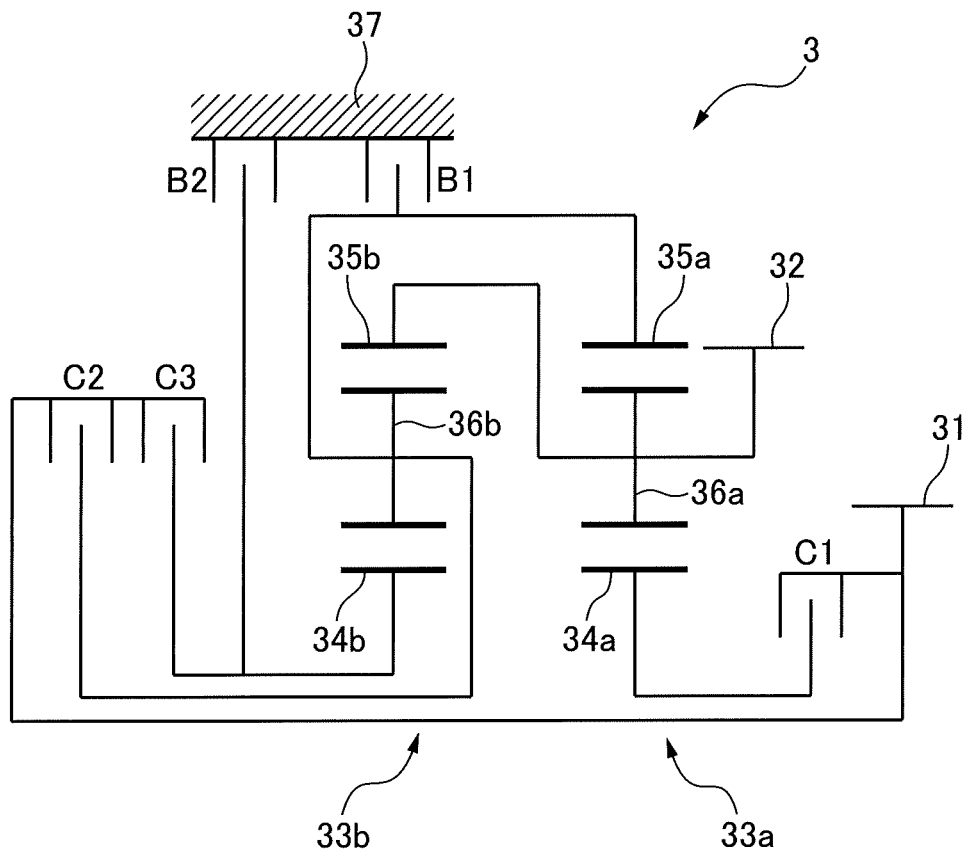
FIG. 2 is a skeleton view showing the configuration of a transmission mechanism.
FIG. 3 is a clutch chart showing engagement elements engaged at the time of predetermined gears.

FIG. 2 is a skeleton view showing the configuration of a transmission mechanism. The transmission mechanism 3 is provided with an input shaft 31, output shaft 32, a plurality of planetary gear mechanisms 33a, 33b, and a plurality of engagement elements. The transmission mechanism 3 transmits the drive force transmitted to the input shaft 31 through the planetary gear mechanisms 33a, 33b to the output shaft 32.

In the present embodiment, the transmission mechanism 3 is provided with two planetary gear mechanisms (first planetary gear mechanism 33a and second planetary gear mechanism 33b). The first planetary gear mechanism 33a includes a first sun gear 34a, first ring gear 35a, first carrier 36a, and first pinion gear. The first carrier 36a supports the first pinion gear to be able to rotate and revolve. The second planetary gear mechanism 33b includes a second sun gear 34b, second ring gear 35b, second carrier 36b, and second pinion gear. The second carrier 36b supports the second pinion gear to be able to rotate and revolve. The first carrier 36a is connected to the second ring gear 35b and the output shaft 32. The second carrier 36b is connected to the first ring gear 35a.

The engagement elements include brakes connecting the rotating elements of the transmission mechanism 3 to the transmission case 37 and clutches connecting the rotating elements of the transmission mechanism 3 with each other. The brakes and clutches are changed between the engaged state and the disengaged state by the oil pressure supplied by the hydraulic oil supply device 4. In the present embodiment, the transmission mechanism 3 is provided with, as engagement elements, a plurality of multiplate brakes (first brake B1 and second brake B2) and a plurality of multiplate clutches (first clutch C1, second clutch C2, and third clutch C3).

In the engaged state, the first brake B1 connects the first ring gear 35a and second carrier 36b to the transmission case 37. That is, in the engaged state, the first brake B1 fixes the first ring gear 35a and second carrier 36b. On the other hand, in the disengaged state, the first brake B1 does not connect the first ring gear 35a and second carrier 36b to the transmission case 37. In the engaged state, the second brake B2 connects the second sun gear 34b to the transmission case 37. That is, in the engaged state, the second brake B2 fixes the second sun gear 34b. On the other hand, in the disengaged state, the second brake B2 does not connect the second sun gear 34b to the transmission case 37.

In the engaged state, the first clutch C1 connects the input shaft 31 to the first sun gear 34a. On the other hand, in the disengaged state, the first clutch C1 does not connect the input shaft 31 to the first sun gear 34a. In the engaged state, the second clutch C2 connects the input shaft 31 to the second carrier 36b. On the other hand, in the disengaged state, the second clutch C2 does not connect the input shaft 31 to the second carrier 36b. In the engaged state, the third clutch C3 connects the input shaft 31 to the second sun gear 34b. On the other hand, in the disengaged state, the third clutch C3 does not connect the input shaft 31 to the second sun gear 34b.

The hydraulic oil supply device 4 is provided with an oil pump, oil pressure control valve, solenoid valve, etc. and supplies hydraulic oil to the torque converter 2 and transmission mechanism 3. The hydraulic oil supplied from the hydraulic oil supply device 4 to the transmission mechanism 3 lubricates the rotating elements of the transmission mechanism 3. Further, the brakes B1, B2 and clutches C1, C2, C3 are switched between the disengaged state and the engaged state by the oil pressure of the hydraulic oil supplied from the hydraulic oil supply device 4 to the brakes B1, B2 and clutches C1, C2, C3.

Control Device of Automatic Transmission

The vehicle is provided with an electronic control unit (ECU) 40. The ECU 40 is an electronic control device controlling the automatic transmission 1. The ECU 40 is provided with a memory such as a read only memory (ROM) and random access memory (RAM), a central processing unit (CPU), an input port, output port, communication module, etc. In the present embodiment, a single ECU 40 is provided, but a plurality of ECUs may be provided for the individual functions. In the present embodiment, the ECU 40 functions as an engagement element control part 41 and a deceleration degree calculating part 42.

The outputs of various sensors provided at the vehicle are input into the ECU 40. In the present embodiment, the outputs of the vehicle speed detection device 51, the throttle opening degree sensor 52, and brake depression force sensor 53 are input into the ECU 40.

The vehicle speed detection device 51 detects the speed of the vehicle. The vehicle speed detection device 51 is, for example, a vehicle speed sensor which detects the speed of the vehicle based on the rotational speed of the wheels of the vehicle. The vehicle speed detection device 51 is connected to the ECU 40. The output of the vehicle speed detection device 51 is transmitted to the ECU 40. Note that, the vehicle speed detection device 51 may be a GPS sensor able to detect the speed of the vehicle from the positional information of the vehicle and the elapsed time.

The throttle opening degree sensor 52 detects an opening degree of a throttle valve provided at the internal combustion engine 10. The throttle opening degree sensor 52 is connected to the ECU 40. The output of the throttle opening degree sensor 52 is transmitted to the ECU 40.

The brake depression force sensor 53 detects the force by which a brake pedal provided at the vehicle is depressed. The brake depression force sensor 53 is connected to the ECU 40. The output of the brake depression force sensor 53 is transmitted to the ECU 40.

The engagement element control part 41 uses the hydraulic oil supply device 4 to change the engagement element between the engaged state and the disengaged state. When the state of a predetermined engagement element is changed, the drive force transmission route at the transmission mechanism 3 changes and the gear realized by the transmission mechanism 3 is changed. If the gear is changed, the ratio of the rotational speed of the input shaft 31 and the rotational speed of the output shaft 32 changes.

The engagement element control part 41 controls the gear realized by the transmission mechanism 3 based on predetermined operating parameters of the vehicle. The predetermined operating parameters are, for example, the vehicle speed and the opening degree of the throttle valve. The vehicle speed is detected by the vehicle speed detection device 51, while the opening degree of the throttle valve is detected by the throttle opening degree sensor 52. Note that, the predetermined operating parameters may be other parameters of the vehicle.

FIG. 3 is a clutch chart showing engagement elements engaged at the time of predetermined gears. In FIG. 3, the O marks show the engagement elements are in the engaged state, while the X marks show the engagement elements are in the disengaged state. At first gear, the first clutch C1 and first brake B1 are made the engaged state, while the second clutch C2, third clutch C3, and second brake B2 are made the disengaged state. At second gear, the first clutch C1 and second brake B2 are made the engaged state, while the second clutch C2, third clutch C3, and first brake B1 are made the disengaged states. In third gear, the first clutch C1 and second clutch C2 are made the engaged states, while the third clutch C3, first brake B1, and second brake B2 are made the disengaged state. At fourth gear, the second clutch C2 and second brake B2 are made the engaged state, while the first clutch C1, third clutch C3, and first brake B1 are made the disengaged state. At reverse gear, the third clutch C3 and first brake B1 are made the engaged state, while the first clutch C1, second clutch C2, and second brake B2 are made the disengaged state.

When an engagement element changes between the engaged state and the disengaged state, that is, when the engagement element slips, friction at the engagement element causes heat to be generated. For this reason, by making an engagement element change between the engaged state and the disengaged state, it is possible to make the hydraulic oil around the engagement element rise in temperature and in turn possible to make the hydraulic oil in the automatic transmission 1 rise in temperature. However, if changing the state of the engagement element without considering the operating state of the vehicle, fluctuations in the rotational speed of the output shaft 32 of the transmission mechanism 3 are liable to cause the drivability to deteriorate. On the other hand, when deceleration of the vehicle is demanded by the driver, changing the state of an engagement element to make the vehicle decelerate in the range of the target deceleration degree does not cause the drivability to deteriorate much at all.

For this reason, in the present embodiment, the engagement element control part 41 makes an engagement element in the disengaged state engage so that the vehicle decelerates if the target deceleration degree is equal to or more than a predetermined value when an increase in temperature of the hydraulic oil in the automatic transmission 1 is demanded. By doing this, the engagement element slips and the heat of friction causes the hydraulic oil around the engagement element to rise in temperature. As a result, the heat of the hydraulic oil around the engagement element is conducted to the other hydraulic oil in the automatic transmission 1 and the hydraulic oil in the automatic transmission 1 is made to rise in temperature. Therefore, it is possible to keep the drivability from deteriorating while promoting the rise in temperature of the hydraulic oil in the automatic transmission 1. Note that, if the rotational speed of the output shaft 32 falls due to making an engagement element in the disengaged state engage, the vehicle decelerates.

Figure 4:
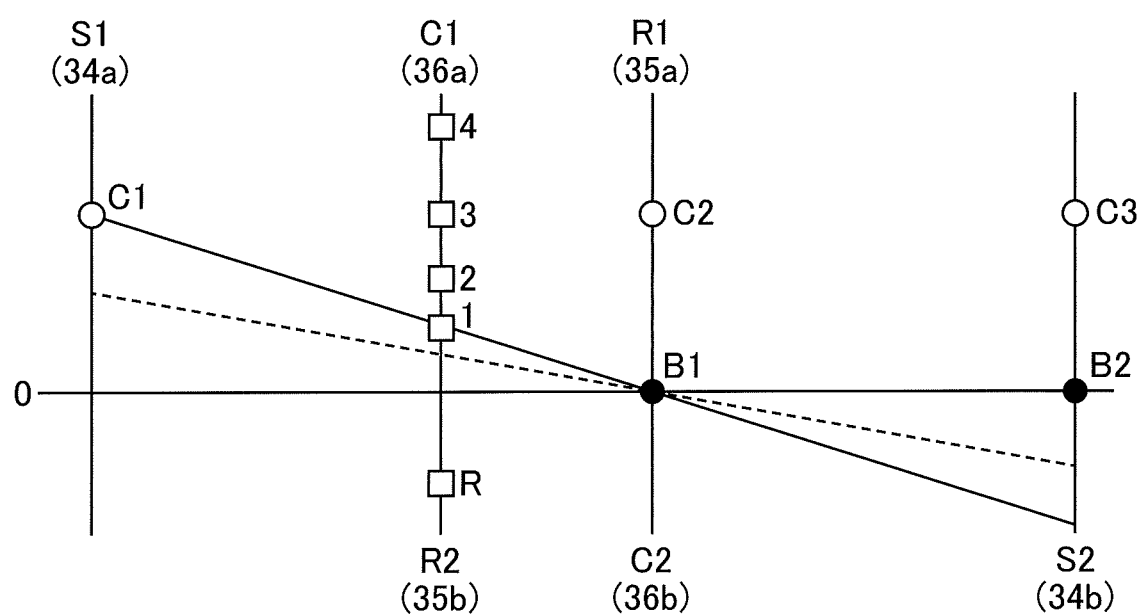
FIG. 4 is an alignment chart showing the speeds of the rotating elements of a transmission mechanism.

FIG. 4 is an alignment chart showing relatively the rotational speeds of the rotating elements of a transmission mechanism. The ordinate of FIG. 4 shows the rotational speeds of the rotating elements of the transmission mechanism 3. In FIG. 4, the rotational speeds of the rotating elements of the transmission mechanism 3 at first gear are shown by the solid line. As explained above, at first gear, the first clutch C1 and first brake B1 are made the engaged state. In this case, the input shaft 31 is connected to the first sun gear 34a and the rotational speeds of the first ring gear 35a and second carrier 36b become zero. As a result, the rotational speed of the output shaft 32 connected to the first carrier 36a and second ring gear 35b becomes the smallest and the gear ratio becomes the largest.

At first gear, if making the second brake B2 change from the disengaged state to the engaged state, as shown in FIG. 4 by the broken line, the rotational speeds of the rotating elements approach zero. That is, the rotational speed of the output shaft 32 falls and the vehicle decelerates. For this reason, when the gear is first gear, the engagement element control part 41 engages the second brake B2 so as to make the hydraulic oil rise in temperature.

As explained above, at second gear, the first clutch C1 and second brake B2 are made the engaged state. At second gear, if making the first brake B1 change from the disengaged state to the engaged state, the rotational speed of the output shaft 32 falls and the vehicle decelerates. For this reason, when the gear is second gear, the engagement element control part 41 makes the first brake B1 engage so as to make the hydraulic oil rise in temperature.

As explained above, at third gear, the first clutch C1 and second clutch C2 are made the engaged state. At third gear, if making the first brake B1 or second brake B2 change from the disengaged state to the engaged state, the rotational speed of the output shaft 32 falls and the vehicle decelerates. For this reason, when the gear is third gear, the engagement element control part 41 makes the first brake B1 or second brake B2 engage so as to make the hydraulic oil rise in temperature.

As explained above, at fourth gear, the second clutch C2 and second brake B2 are made the engaged state. At fourth gear, if making the first brake B1 or first clutch C1 change from the disengaged state to the engaged state, the rotational speed of the output shaft 32 falls and the vehicle decelerates. For this reason, when the gear is fourth gear, the engagement element control part 41 makes the first brake B1 or first clutch C1 engage so as to make the hydraulic oil rise in temperature. Note that, in the present embodiment, only one engagement element is made to engage so as to make the hydraulic oil rise in temperature.

The deceleration degree calculating part 42 calculates the target deceleration degree of the vehicle. For example, the deceleration degree calculating part 42 calculates the target deceleration degree of the vehicle based on the output of the brake depression force sensor 53. Note that, the deceleration degree calculating part 42 may calculate the target deceleration degree of the vehicle based on the output of a stroke sensor detecting a stroke of the brake pedal. In this case, instead of the output of the brake depression force sensor 53, the output of the stroke sensor is input to the ECU 40. Further, the deceleration degree calculating part 42 may calculate the target deceleration degree of the vehicle based on the output of a pressure sensor detecting a pressure of a brake booster. In this case, instead of the output of the brake depression force sensor 53, the output of the pressure sensor is input to the ECU 40.

Processing for Raising Temperature of Hydraulic Oil

Figure 5:
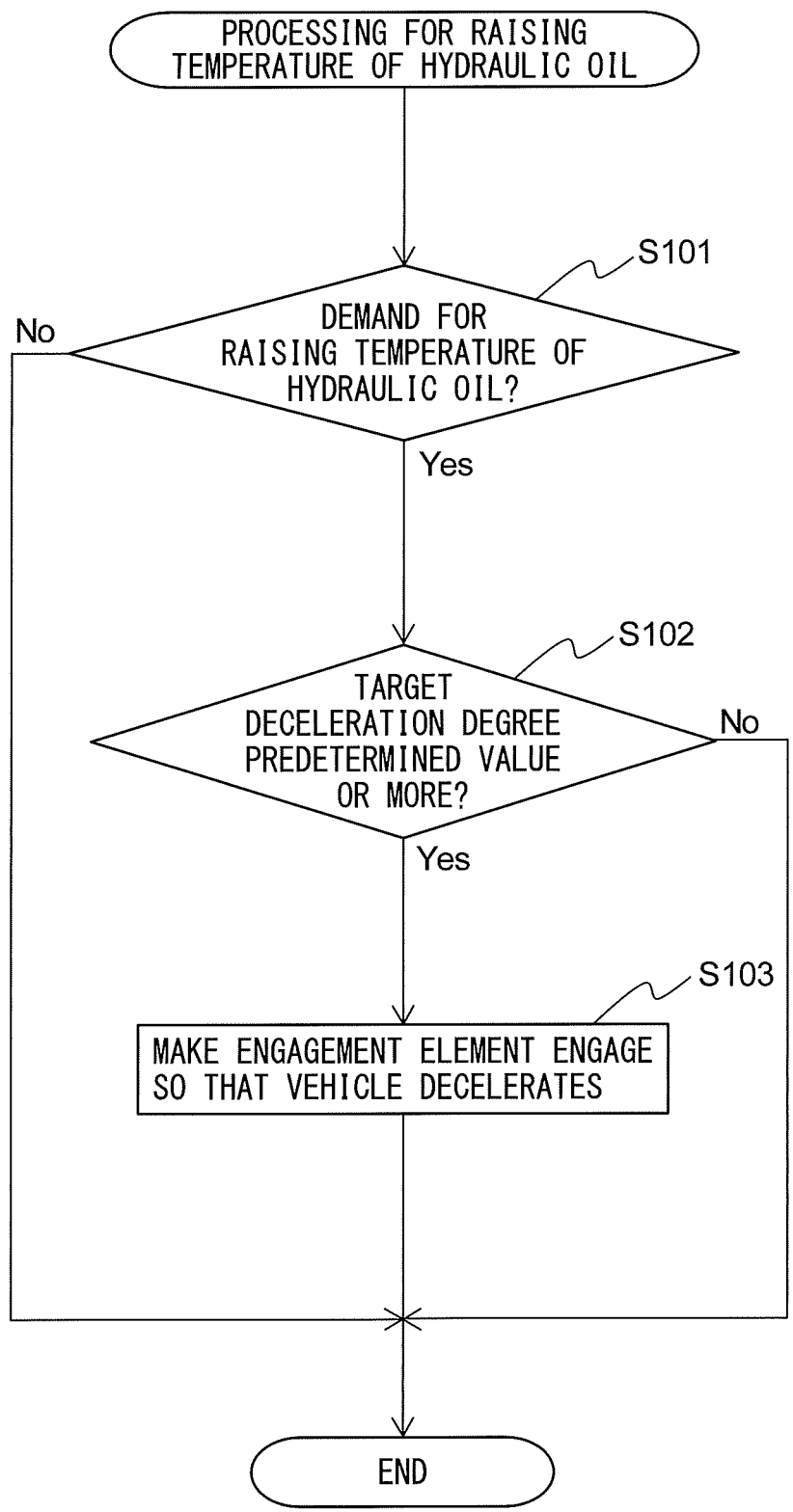
FIG. 5 is a flow chart showing a control routine of processing for raising the temperature of a hydraulic oil in the first embodiment of the present invention.

Below, referring to the flow chart of FIG. 5, control for making the hydraulic oil in the automatic transmission 1 rise in temperature will be explained. FIG. 5 is a flow chart showing a control routine of processing for raising the temperature of a hydraulic oil in the first embodiment of the present invention. The present control routine is repeatedly performed by the ECU 40 after the ignition switch of the vehicle is turned to ON.

First, at step S101, the engagement element control part 41 judges whether there is a demand for raising the temperature of the hydraulic oil in the automatic transmission 1. For example, a demand for raising the temperature of the hydraulic oil is generated when the temperature of the hydraulic oil in the automatic transmission 1 is equal to or less than a threshold value. The threshold value is determined in advance while considering the drive resistance of the automatic transmission 1 etc. The temperature of the hydraulic oil in the automatic transmission 1 is, for example, detected by an oil temperature sensor provided in the automatic transmission 1. Further, the hydraulic oil in the automatic transmission 1 can exchange heat with the cooling water used for cooling the internal combustion engine 10. For this reason, a demand for raising the temperature of the hydraulic oil is generated when warmup of the internal combustion engine 10 by the hydraulic oil is required as well.

If at step S101 it is judged that there is no demand for raising the temperature of the hydraulic oil, the present control routine ends. On the other hand, if it is judged that there is a demand for raising the temperature of the hydraulic oil, the present control routine proceeds to step S102. At step S102, the engagement element control part 41 judges whether the target deceleration degree of the vehicle is equal to or more than a predetermined value. The predetermined value is determined in advance and is set to a value which is equal to or more than the minimum value of the degree of deceleration caused by making an engagement element engage at step S103.

If at step S102 it is judged that the target deceleration degree is less than a predetermined value, the present control routine ends. On the other hand, if it is judged that the target deceleration degree is equal to or more than a predetermined value, the present control routine proceeds to step S103.

At step S103, the engagement element control part 41 makes an engagement element in the disengaged state engage so that the vehicle decelerates. Specifically, when the gear realized by the transmission mechanism 3 is first gear, the engagement element control part 41 makes the second brake B2 engage. When the gear realized by the transmission mechanism 3 is second gear, the engagement element control part 41 makes the first brake B1 engage. When the gear realized by the transmission mechanism 3 is third gear, the engagement element control part 41 makes the first brake B1 or second brake B2 engage. When the gear realized by the transmission mechanism 3 is fourth gear, the engagement element control part 41 makes the first brake B1 or first clutch C1 engage. After step S103, the present control routine ends.

Note that, at step S103, the degree of engagement of the engagement element may be adjusted in accordance with the target deceleration degree. In this case, the larger the target deceleration degree, the larger the degree of engagement is made. The degree of engagement is adjusted by using the hydraulic oil supply device 4 to adjust the oil pressure supplied to the engagement element. Further, at step S103, a slip time of the engagement element may be adjusted in accordance with the target deceleration degree. In this case, the larger the target deceleration degree, the longer the slip time is made. The slip time is adjusted by using the hydraulic oil supply device 4 to adjust the time during which hydraulic oil is supplied to the engagement element.

Second Embodiment

The control device of an automatic transmission according to a second embodiment is basically similar in configuration and control to the control device of an automatic transmission according to the first embodiment except for the points explained below. For this reason, below, the second embodiment of the present invention will be explained centered on the parts different from the first embodiment.

Figure 6:
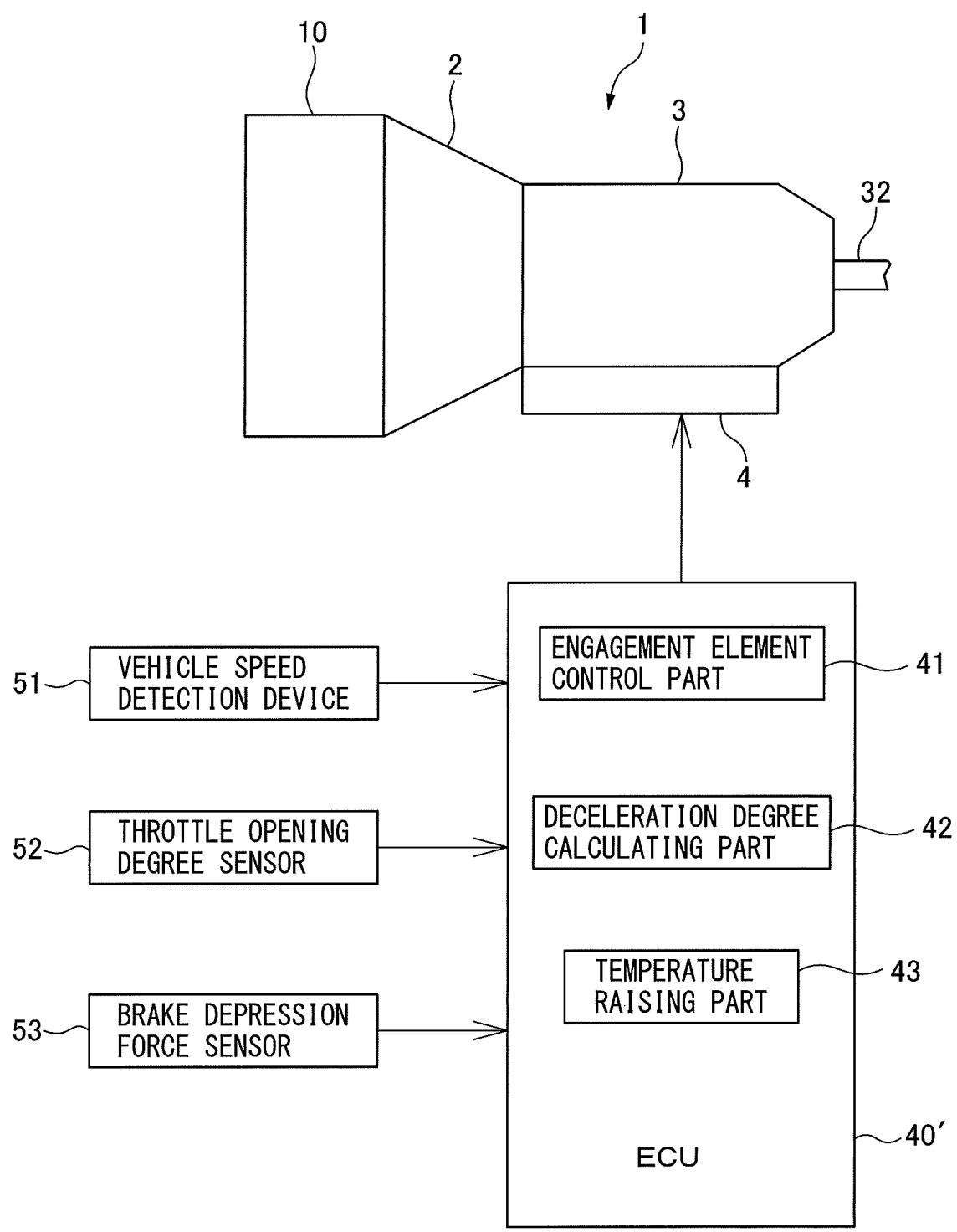
FIG. 6 is a view schematically showing a control device of an automatic transmission according to a second embodiment of the present invention and an automatic transmission to which the control device is applied.

FIG. 6 is a view schematically showing a control device of an automatic transmission according to the second embodiment of the present invention and an automatic transmission to which the control device is applied. In the second embodiment, the ECU 40' functions as the engagement element control part 41, deceleration degree calculating part 42, and temperature raising part 43.

The temperature raising part 43 makes the hydraulic oil in the automatic transmission 1 rise in temperature. Specifically, the temperature raising part 43 makes the hydraulic oil in the automatic transmission 1 rise in temperature without changing the state of an engagement element if the target deceleration degree of the vehicle is less than a predetermined value when an increase in temperature of the hydraulic oil in the automatic transmission 1 is demanded.

For example, the temperature raising part 43 makes the lockup clutch engage if the target deceleration degree of the vehicle is less than a predetermined value when an increase in temperature of the hydraulic oil in the automatic transmission 1 is demanded. By doing this, it is possible to make the amount of work of an oil pump of the hydraulic oil supply device 4 increase and possible to make the hydraulic oil in the automatic transmission 1 rise in temperature.

Further, the temperature raising part 43 may raise the oil pressure (line pressure) supplied to the engagement element so as to make the engagement element engage if the target deceleration degree of the vehicle is less than a predetermined value when an increase in temperature of the hydraulic oil in the automatic transmission 1 is demanded. The line pressure is controlled by the oil pressure control valve. In this case as well, it is possible to make the amount of work of the oil pump increase and possible to make the hydraulic oil in the automatic transmission 1 rise in temperature. Note that, as long as the state of an engagement element does not change, the temperature raising part 43 may use any other method to make the hydraulic oil in the automatic transmission 1 rise in temperature.

Due to the above-mentioned control, even if the target deceleration degree of the vehicle is less than a predetermined value, it is possible to make the hydraulic oil in the automatic transmission 1 rise in temperature. For this reason, it is possible to promote much more the rise in temperature of the hydraulic oil in the automatic transmission 1.

Processing for Raising Temperature of Hydraulic Oil

Figure 7:
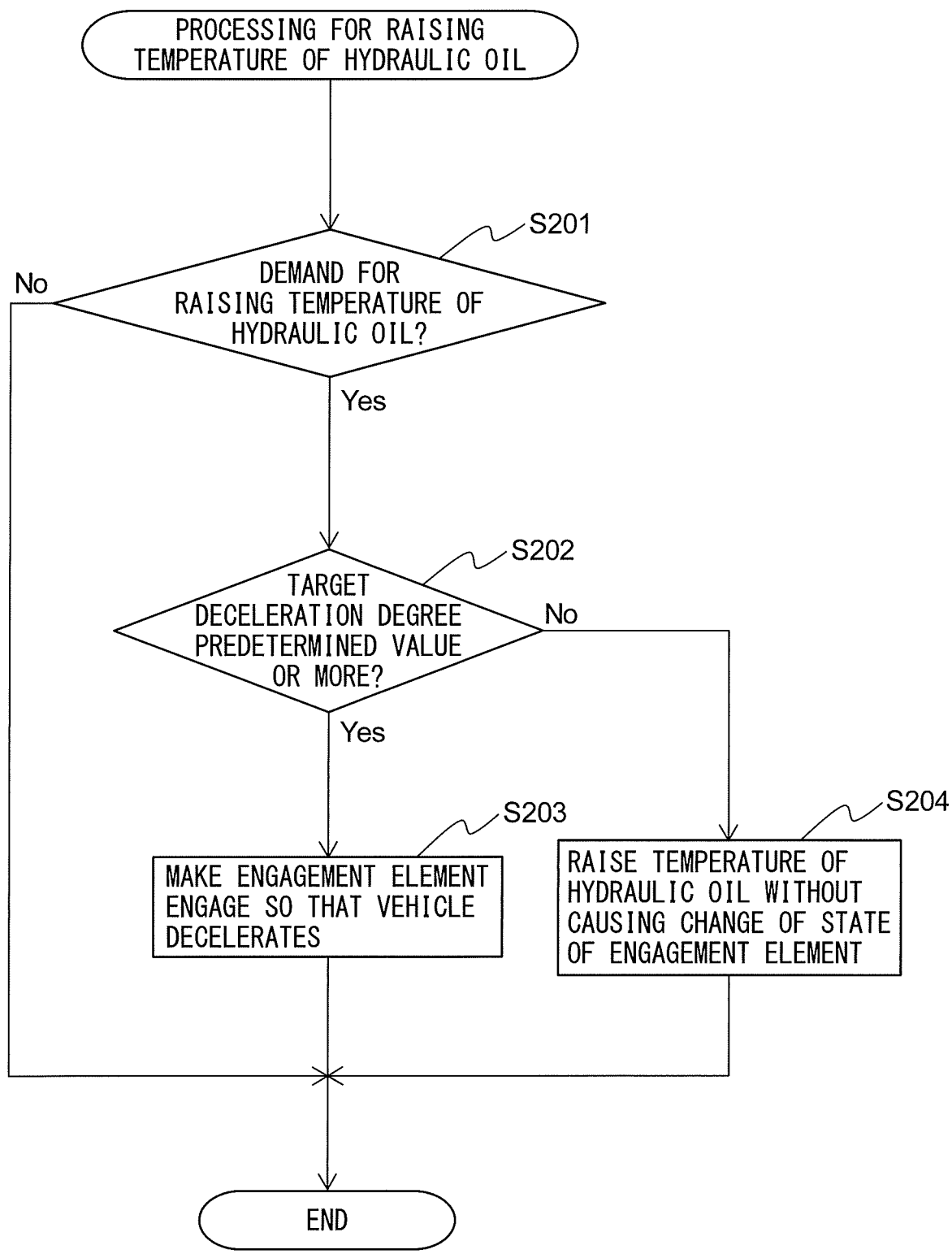
FIG. 7 is a flow chart showing a control routine of processing for raising the temperature of a hydraulic oil in the second embodiment of the present invention.

FIG. 7 is a flow chart showing a control routine of processing for raising the temperature of a hydraulic oil in the second embodiment of the present invention. The present control routine is repeatedly performed by the ECU 40 after the ignition switch of the vehicle is turned to ON.

Step S201 to step S203 are similar to step S101 to step S103 of FIG. 5, so explanations will be omitted. If at step S202 it is judged that the target deceleration degree of the vehicle is less than a predetermined value, the present control routine proceeds to step S204.

At step S204, the temperature raising part 43 uses a method such as explained above to make the hydraulic oil in the automatic transmission 1 rise in temperature without changing the state of the engagement element. After step S204, the present control routine ends.

Third Embodiment

The control device of an automatic transmission according to a third embodiment is basically similar in configuration and control to the control device of an automatic transmission according to the first embodiment except for the points explained below. For this reason, below, the third embodiment of the present invention will be explained centered on the parts different from the first embodiment.

Figure 8:
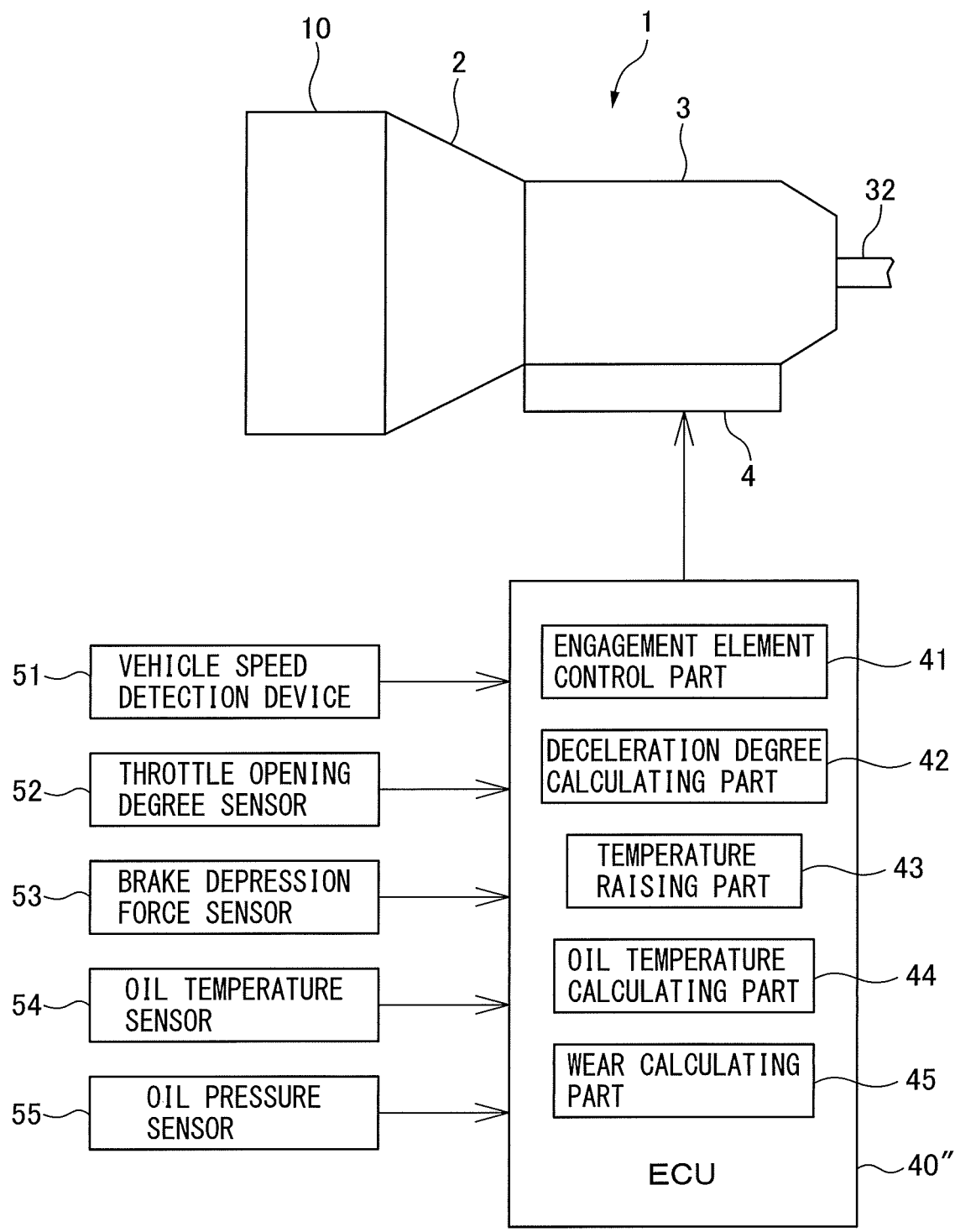
FIG. 8 is a view schematically showing a control device of an automatic transmission according to a third embodiment of the present invention and an automatic transmission to which the control device is applied.

FIG. 8 is a view schematically showing a control device of an automatic transmission according to the third embodiment of the present invention and an automatic transmission to which the control device is applied. In the third embodiment, the ECU 40" functions as the engagement element control part 41, deceleration degree calculating part 42, temperature raising part 43, oil temperature calculating part 44, and wear calculating part 45. The function of the temperature raising part 43 is as explained in the second embodiment. In the third embodiment, the outputs of the vehicle speed detection device 51, throttle opening degree sensor 52, brake depression force sensor 53, oil temperature sensor 54, and oil pressure sensor 55 are input to the ECU 40".

The oil temperature sensor 54 is provided in the automatic transmission 1 and detects the temperature of the hydraulic oil in the automatic transmission 1. The oil temperature sensor 54 is connected to the ECU 40". The output of the oil temperature sensor 54 is transmitted to the ECU 40".

The oil pressure sensor 55 is provided at the hydraulic oil supply device 4 and detects the oil pressure (line pressure) supplied to the engagement element for making the engagement element engage. The oil pressure sensor 55 is connected to the ECU 40". The output of the oil pressure sensor 55 is transmitted to the ECU 40".

The oil temperature calculating part 44 calculates the temperature of the hydraulic oil around the engagement element. For example, the oil temperature calculating part 44 calculates the temperature of the hydraulic oil around the engagement element based on the temperature of the hydraulic oil detected by the oil temperature sensor 54, the line pressure detected by the oil pressure sensor 55, the time when the engagement element slips, the time when the engagement element does not slip, etc.

Note that, to calculate the temperature of the hydraulic oil around an engagement element, instead of the line pressure detected by the oil pressure sensor 55, the amount of deceleration of the vehicle when making an engagement element slip may be used. The amount of deceleration of the vehicle is detected by the vehicle speed detection device 51. Further, to calculate the temperature of the hydraulic oil around the engagement element, the temperature of the air outside the vehicle may be used in addition to the above parameters. The temperature of the air outside the vehicle is detected by for example an outside air temperature sensor. Note that, to calculate the temperature of the hydraulic oil around the engagement element, other parameters correlated with the temperature of the hydraulic oil around the engagement element may be used.

The wear calculating part 45 calculates the degree of wear of the engagement element. For example, the wear calculating part 45 calculates the degrees of wear of an engagement element based on the number of times the state of the engagement element changes between the engaged state and the disengaged state for change of gear, the time over which the engagement element is made to slip for change of gear, the time over which the engagement element is made to slip for raising the temperature of the hydraulic oil at a timing other than a change of gear, the size of the engagement element, etc. Note that, to calculate the degree of wear of an engagement element, other parameters correlated with the degrees of wear of the engagement element may be used.

If the temperature of the hydraulic oil around the engagement element exceeds the heat resistance temperature of the engagement element, the engagement element is liable to be damaged. Further, slip of the engagement element promotes wear of the engagement element, so when the degree of wear of the engagement elements is large, it is not desirable to proactively make the engagement element slip. For this reason, in the third embodiment, the engagement element control part 41 makes the engagement element in the disengaged state engage so that the vehicle decelerates if the target deceleration degree of the vehicle is equal to or more than a predetermined value, the temperature of the hydraulic oil around the engagement element is equal to or less than a predetermined value, and the degree of wear of the engagement element is equal to or less than a predetermined value when an increase in temperature of the hydraulic oil in the automatic transmission 1 is demanded. By doing this, it is possible to keep an engagement element from being damaged and worn while making the hydraulic oil in the automatic transmission 1 rise in temperature.

Further, the engagement element control part 41 makes the state of an engagement element change so that the vehicle does not decelerate if the target deceleration degree of the vehicle is less than a predetermined value, the temperature of the hydraulic oil around the engagement element is equal to or less than a predetermined value, and the degree of wear of the engagement element is equal to or less than a predetermined value when an increase in temperature of the hydraulic oil in the automatic transmission 1 is demanded. By making the state of the engagement element change, the engagement element slips and the heat of friction causes the hydraulic oil around the engagement element to rise in temperature. As a result, the heat of the hydraulic oil around the engagement element is conveyed to other hydraulic oil in the automatic transmission 1, and the hydraulic oil in the automatic transmission 1 is increased in temperature. Note that, if making the state of the engagement element change does not cause the rotational speed of the output shaft 32 to fall, that is, if making the state of the engagement element change results in the rotational speed of the output shaft 32 being maintained or rising, the vehicle will not decelerate.

The engagement element control part 41, for example, changes the state of the engagement element as follows so that the vehicle does not decelerate. If the gear realized by the transmission mechanism 3 is first gear, the engagement element control part 41 disengages the first brake B1 to make the first brake B1 slip. If the gear realized by the transmission mechanism 3 is second gear or fourth gear, the engagement element control part 41 disengages the second brake B2 to make the second brake B2 slip. If the gear realized by the transmission mechanism 3 is third gear, the engagement element control part 41 disengages the first clutch C1 to make the first clutch C1 slip or disengages the second clutch C2 to make the second clutch C2 slip. In these cases, the rotational speed of the output shaft 32 does not fall, so the vehicle does not decelerate.

Note that, if the gear realized by the transmission mechanism 3 is second gear, the engagement element control part 41 may engage the first brake B1 and disengage the second brake B2 and make the first brake B1 and second brake B2 slip. Further, if the gear realized by the transmission mechanism 3 is third gear, the engagement element control part 41 may engage the second brake B2 and disengage the second clutch C2 and make the second brake B2 and second clutch C2 slip. Further, if the gear realized by the transmission mechanism 3 is fourth gear, the engagement element control part 41 may engage the first clutch C1 and disengage the second brake B2 and make the first clutch C1 and second brake B2 slip. In these cases as well, the rotational speed of the output shaft 32 does not fall, so the vehicle does not decelerate.

Further, the temperature raising part 43 makes the hydraulic oil in the automatic transmission 1 rise in temperature without changing the state of the engagement element if the temperature of the hydraulic oil around the engagement element is higher than a predetermined value or the degree of wear of the engagement element is greater than a predetermined value when an increase in temperature of the hydraulic oil in the automatic transmission 1 is demanded. Due to this, it is possible to make the hydraulic oil in the automatic transmission 1 rise in temperature without causing an engagement element to be damaged or worn.

Processing for Raising Temperature of Hydraulic Oil

Figure 9:
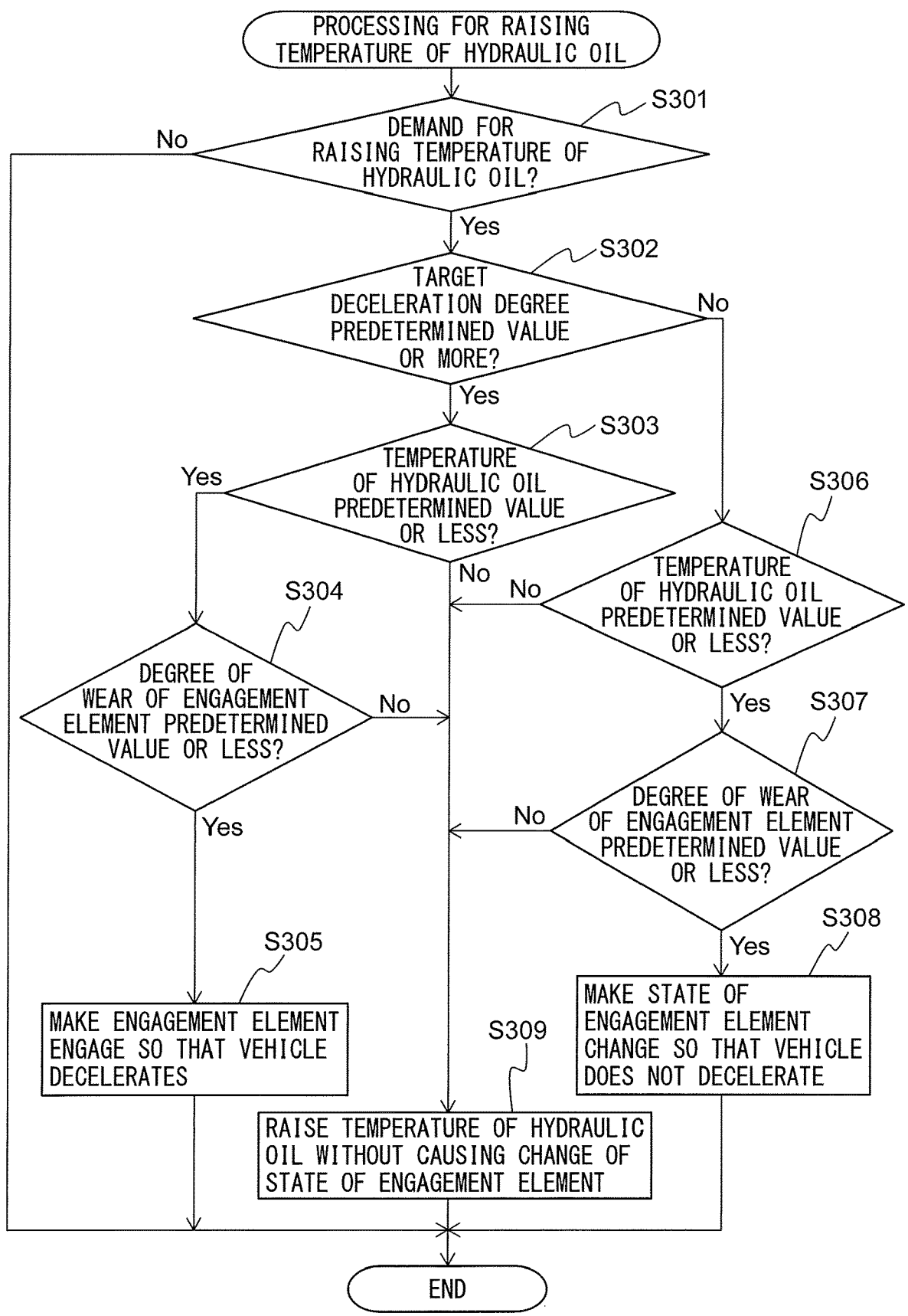
FIG. 9 is a flow chart showing a control routine of processing for raising the temperature of a hydraulic oil in the third embodiment of the present invention.

FIG. 9 is a flow chart showing a control routine of processing for raising the temperature of a hydraulic oil in the third embodiment of the present invention. The present control routine is repeatedly performed by the ECU 40 after the ignition switch of the vehicle is turned to ON.

Step S301 and step S302 are similar to step S101 and step S102 of FIG. 5, so explanations will be omitted. If at step S302 it is judged that the target deceleration degree of the vehicle is equal to or more than a predetermined value, the present control routine proceeds to step S303.

At step S303, the engagement element control part 41 judges whether the temperature of the hydraulic oil around the engagement element engaged at step S305 is equal to or less than a predetermined value. The predetermined value is determined in advance and is set to a value so that when an engagement element is engaged at step S305, the temperature of the hydraulic oil will not exceed the heat resistance temperature of the engagement element. The temperature of the hydraulic oil around the engagement element is calculated by the oil temperature calculating part 44.

If at step S303 it is judged that the temperature of the hydraulic oil is equal to or less than a predetermined value, the present control routine proceeds to step S304. At step S304, the engagement element control part 41 judges whether the degree of wear of the engagement element engaged at step S305 is equal to or less than a predetermined value. The predetermined value is determined in advance considering the wear resistance of the engagement element etc. The degree of wear of the engagement element is calculated by the wear calculating part 45.

If at step S304 it is judged that the degree of wear of the engagement element is equal to or less than a predetermined value, the present control routine proceeds to step S305. At step S305, in the same way as step S103 of FIG. 5, the engagement element control part 41 makes the engagement element in the disengaged state engage so that the vehicle decelerates. After step S305, the present control routine ends.

On the other hand, if at step S302 it is judged that the target deceleration degree of the vehicle is less than a predetermined value, the present control routine proceeds to step S306. At step S306, the engagement element control part 41 judges whether the temperature of the hydraulic oil around the engagement element which changed in state at step S308 is equal to or less than a predetermined value. The predetermined value is predetermined and is set to a value so that the temperature of the hydraulic oil does not exceed the heat resistance temperature of the engagement element when the state of the engagement element changes at step S308. The temperature of the hydraulic oil around the engagement element is calculated by the oil temperature calculating part 44.

If at step S306 it is judged that the temperature of the hydraulic oil is equal to or less than a predetermined value, the present control routine proceeds to step S307. At step S307, the engagement element control part 41 judges whether the degree of wear of an engagement element which changed in state at step S308 is equal to or less that a predetermined value. The predetermined value is determined in advance considering the wear resistance of the engagement element etc. The degree of wear of the engagement element is calculated by the wear calculating part 45.

If at step S307 it is judged that the degree of wear of the engagement element is equal to or less than a predetermined value, the present control routine proceeds to step S308. At step S308, the engagement element control part 41 uses a method such as described above to change the state of the engagement element so that the vehicle does not decelerate. After step S308, the present control routine ends.

Further, if at step S303 or step S306 it is judged that the temperature of the hydraulic oil is less than a predetermined value or if at step S304 or step S307 it is judged that the degree of wear of the engagement element is less than a predetermined value, the present control routine proceeds to step S309. At step S309, in the same way as step S204 of FIG. 7, the temperature raising part 43 makes the hydraulic oil in the automatic transmission 1 rise in temperature without making the state of the engagement element change. After step S309, the present control routine ends.

Note that, step S304 and step S307 may be omitted. In this case, the engagement element control part 41 makes the engagement element in the disengaged state engage so that the vehicle decelerates if the target deceleration degree of the vehicle is equal to or more than a predetermined value and the temperature of the hydraulic oil around the engagement element is equal to or less than a predetermined value when an increase in temperature of the hydraulic oil in the automatic transmission 1 is demanded. Further, the engagement element control part 41 changes the state of the engagement element so that the vehicle does not decelerate if the target deceleration degree of the vehicle is less than a predetermined value and the temperature of the hydraulic oil around the engagement element is equal to or less than a predetermined value when an increase in temperature of the hydraulic oil in the automatic transmission 1 is demanded. Further, the temperature raising part 43 makes the hydraulic oil in the automatic transmission 1 rise in temperature without making the state of the engagement element change if the temperature of the hydraulic oil around the engagement element is higher than a predetermined value when an increase in temperature of the hydraulic oil in the automatic transmission 1 is demanded.

Further, step S303 and step S306 may be omitted. In this case, the engagement element control part 41 makes the engagement element in the disengaged state engage so that the vehicle decelerates if the target deceleration degree of the vehicle is equal to or more than a predetermined value and the degree of wear of the engagement element is equal to or less than a predetermined value when an increase in temperature of the hydraulic oil in the automatic transmission 1 is demanded. Further, the engagement element control part 41 changes the state of the engagement element so that the vehicle does not decelerate if the target deceleration degree of the vehicle is less than a predetermined value and the degree of wear of the engagement element is equal to or less than a predetermined value when an increase in temperature of the hydraulic oil in the automatic transmission 1 is demanded. Further, the temperature raising part 43 makes the hydraulic oil in the automatic transmission 1 rise in temperature without changing the state of the engagement element if the degree of wear of the engagement element is greater than a predetermined value when an increase in temperature of the hydraulic oil in the automatic transmission 1 is demanded.

Above, preferred embodiments of the present invention were explained, but the present invention is not limited to these embodiments and can be corrected and changed in various ways within the language of the claims. For example, at step S204 of FIG. 7, the engagement element control part 41, in the same way as step S308 of FIG. 9, may change the state of the engagement element so that the vehicle does not decelerate. That is, the engagement element control part 41 may change the state of an engagement element so that the vehicle does not decelerate if the target deceleration degree of the vehicle is less than a predetermined value when an increase in temperature of the hydraulic oil in the automatic transmission 1 is demanded.

Further, the automatic transmission 1 may be provided with multiple clutches, etc., instead of the torque converter 2. Further, the configuration of the transmission mechanism 3 is not limited to the configuration such as shown in FIG. 2. For example, the transmission mechanism 3 may be configured to realize other than four gears (for example, five to nine gears etc.). Further, the transmission mechanism 3 may be provided with a Ravigneaux type planetary gear mechanism.

REFERENCE SIGNS LIST

1 automatic transmission
3 transmission mechanism
4 hydraulic oil supply device
40 electronic control unit (ECU)
41 engagement element control part
42 deceleration degree calculating part
B1 first brake
B2 second brake
C1 first clutch
C2 second clutch
C3 third clutch

The invention claimed is:

1. A control device of an automatic transmission for controlling an automatic transmission comprising a transmission mechanism including a plurality of engagement elements and a hydraulic oil supply device supplying hydraulic oil to the transmission mechanism, comprising:
an engagement element control part configured to use the hydraulic oil supply device to make the plurality of engagement elements change between an engaged state and a disengaged state; and
a deceleration degree calculating part configured to calculate a target deceleration degree of a vehicle in which the automatic transmission is provided,
wherein the engagement element control part is configured to make an engagement element of the plurality of engagement elements in the disengaged state engage so that the vehicle decelerates if the target deceleration degree is equal to or more than a predetermined value when an increase in temperature of hydraulic oil in the automatic transmission is demanded.

2. The control device of an automatic transmission according to claim 1, wherein the engagement element control part is configured to make a state of the engagement element change so that the vehicle does not decelerate if the target deceleration degree is less than a predetermined value when an increase in temperature of hydraulic oil in the automatic transmission is demanded.

3. The control device of an automatic transmission according to claim 1, further comprising a temperature raising part configured to make hydraulic oil in the automatic transmission rise in temperature, wherein
the temperature raising part is configured to make hydraulic oil in the automatic transmission rise in temperature without changing a state of the engagement element if the target deceleration degree is less than a predetermined value when an increase in temperature of hydraulic oil in the automatic transmission is demanded.

4. The control device of an automatic transmission according to claim 1, further comprising an oil temperature calculating part configured to calculate a temperature of the hydraulic oil around the engagement element, wherein
the engagement element control part is configured to make the engagement element in the disengaged state engage so that the vehicle decelerates if the target deceleration degree is equal to or more than a predetermined value and a temperature of the hydraulic oil around the engagement element is equal to or less than a predetermined value when an increase in temperature of hydraulic oil in the automatic transmission is demanded.

5. The control device of an automatic transmission according to claim 4, wherein the engagement element control part is configured to change a state of the engagement element so that the vehicle does not decelerate if the target deceleration degree is less than a predetermined value and the temperature of the hydraulic oil around the engagement element is equal to or less than a predetermined value when an increase in temperature of hydraulic oil in the automatic transmission is demanded.

6. The control device of an automatic transmission according to claim 4, further comprising a temperature raising part configured to make hydraulic oil in the automatic transmission rise in temperature, wherein
the temperature raising part is configured to make hydraulic oil in the automatic transmission rise in temperature without changing a state of the engagement element if a temperature of the hydraulic oil around the engagement element is higher than a predetermined value when an increase in temperature of hydraulic oil in the automatic transmission is demanded.

7. The control device of an automatic transmission according to claim 5, further comprising a temperature raising part configured to make hydraulic oil in the automatic transmission rise in temperature, wherein
the temperature raising part is configured to make hydraulic oil in the automatic transmission rise in temperature without changing a state of the engagement element if a temperature of the hydraulic oil around the engagement element is higher than a predetermined value when an increase in temperature of hydraulic oil in the automatic transmission is demanded.

8. The control device of an automatic transmission according to claim 1, further comprising a wear calculating part configured to calculate a degree of wear of the engagement element, wherein
the engagement element control part is configured to make the engagement element in the disengaged state engage so that the vehicle decelerates if the target deceleration degree is equal to or more than a predetermined value and the degree of wear of the engagement element is equal to or less than a predetermined value when an increase in temperature of hydraulic oil in the automatic transmission is demanded.

9. The control device of an automatic transmission according to claim 8, wherein the engagement element control part is configured to change a state of the engagement element so that the vehicle does not decelerate if the target deceleration degree is less than a predetermined value and the degree of wear of the engagement element is equal to or less than a predetermined value when an increase in temperature of hydraulic oil in the automatic transmission is demanded.

10. The control device of an automatic transmission according to claim 8, further comprising a temperature raising part configured to make hydraulic oil in the automatic transmission rise in temperature, wherein
the temperature raising part is configured to make hydraulic oil in the automatic transmission rise in temperature without changing the state of the engagement element if the degree of wear of the engagement element is greater than a predetermined value when an increase in temperature of hydraulic oil in the automatic transmission is demanded.

11. The control device of an automatic transmission according to claim 9, further comprising a temperature raising part configured to make hydraulic oil in the automatic transmission rise in temperature, wherein
the temperature raising part is configured to make hydraulic oil in the automatic transmission rise in temperature without changing the state of the engagement element if the degree of wear of the engagement element is greater than a predetermined value when an increase in temperature of hydraulic oil in the automatic transmission is demanded.

12. The control device of an automatic transmission according to claim 1, further comprising
an oil temperature calculating part configured to calculate a temperature of the hydraulic oil around the engagement element, and
a wear calculating part configured to calculate a degree of wear of the engagement element, wherein
the engagement element control part is configured to make the engagement element in the disengaged state engage so that the vehicle decelerates if the target deceleration degree is equal to or more than a predetermined value, the temperature of the hydraulic oil around the engagement element is equal to or less than a predetermined value, and the degree of wear of the engagement element is equal to or less than a predetermined value when an increase in temperature of hydraulic oil in the automatic transmission is demanded.

13. The control device of an automatic transmission according to claim 12, wherein the engagement element control part is configured to change a state of the engagement element so that the vehicle does not decelerate if the target deceleration degree is less than a predetermined value, the temperature of the hydraulic oil around the engagement element is equal to or less than a predetermined value, and the degree of wear of the engagement element is equal to or less than a predetermined value when an increase in temperature of hydraulic oil in the automatic transmission is demanded.

14. The control device of an automatic transmission according to claim 12, further comprising a temperature raising part configured to make hydraulic oil in the automatic transmission rise in temperature, wherein
the temperature raising part is configured to make hydraulic oil in the automatic transmission rise in temperature without changing a state of the engagement element if the temperature of the hydraulic oil around the engagement element is higher than a predetermined value or if the degree of wear of the engagement element is greater than a predetermined value when an increase in temperature of hydraulic oil in the automatic transmission is demanded.

15. The control device of an automatic transmission according to claim 13, further comprising a temperature raising part configured to make hydraulic oil in the automatic transmission rise in temperature, wherein
the temperature raising part is configured to make hydraulic oil in the automatic transmission rise in temperature without changing a state of the engagement element if the temperature of the hydraulic oil around the engagement element is higher than a predetermined value or if the degree of wear of the engagement element is greater than a predetermined value when an increase in temperature of hydraulic oil in the automatic transmission is demanded.

* * * * *